United States Patent [19]

Kelson

[11] Patent Number: 4,653,170
[45] Date of Patent: Mar. 31, 1987

[54] METHOD FOR HANDLEBAR GRIP INSTALLATION

[76] Inventor: Arnold A. Kelson, 81 Tara Rd., Papillion, Nebr.

[21] Appl. No.: 817,561

[22] Filed: Jan. 10, 1986

[51] Int. Cl.$^4$ .............................................. B23P 11/02
[52] U.S. Cl. ....................................... 29/450; 29/423; 29/234; 29/235; 74/551.9; 428/542.8
[58] Field of Search ............... 29/450, 234, 235, 423, 29/278, 280; 273/81 R, 165; 74/551.1, 551.9; 428/542.8

[56] References Cited

U.S. PATENT DOCUMENTS

| | | | |
|---|---|---|---|
| 2,830,361 | 4/1958 | Bruner | 29/235 |
| 2,840,896 | 7/1958 | Edwards | 29/234 X |
| 3,182,387 | 5/1965 | Sundberg | 29/235 X |
| 3,315,338 | 4/1967 | Tegges | 29/235 X |
| 3,515,798 | 6/1970 | Sievert | 29/235 X |
| 3,921,273 | 11/1975 | Kondo et al. | 29/423 X |
| 3,946,480 | 3/1976 | Dienes | 29/235 |
| 4,273,161 | 6/1981 | McLaughlin | 29/235 X |
| 4,389,440 | 6/1983 | Keith | 29/235 X |
| 4,466,166 | 8/1984 | Hogarth | 29/235 |
| 4,503,105 | 3/1985 | Tomioka | 29/235 X |

FOREIGN PATENT DOCUMENTS 816764  7/1959  United Kingdom .............. 74/551.9

Primary Examiner—Charlie T. Moon
Attorney, Agent, or Firm—Thomas M. Scofield

[57] ABSTRACT

Improvements in means of and methods for mounting grips (hand grips, for example) on handlebars of bicycles and motorcycles; improvements in means of and methods for mounting resilient sleeves on shafts, pipes, rods and the like; inserting a plastic sleeve or strip into a resilient sleeve or handgrip, such operable to serve as a sliding, low friction surface with respect to a handlebar, shaft, pipe, rod or the like as the resilient sleeve or handgrip is mounted thereon.

25 Claims, 21 Drawing Figures

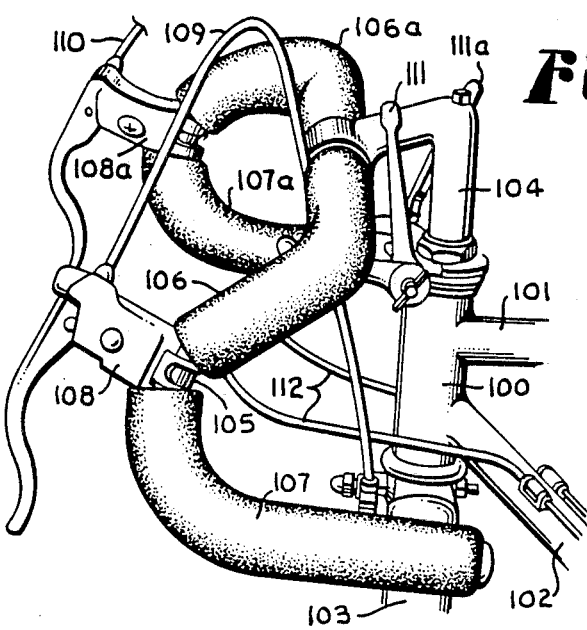
Fig.1.
Fig.2.
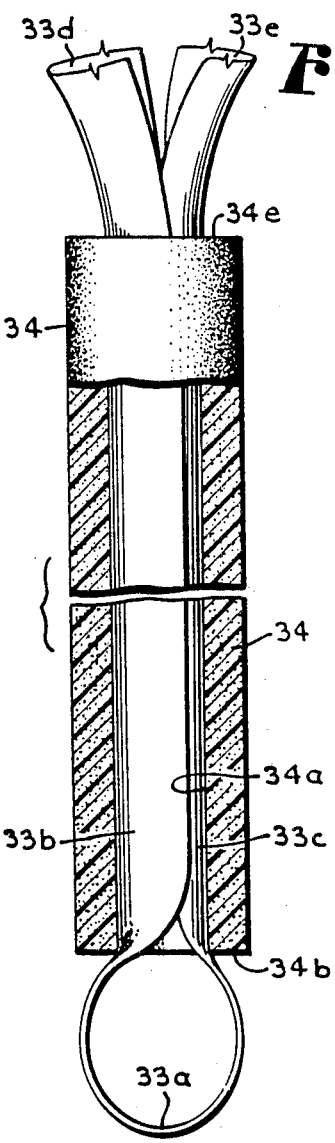
Fig.4.
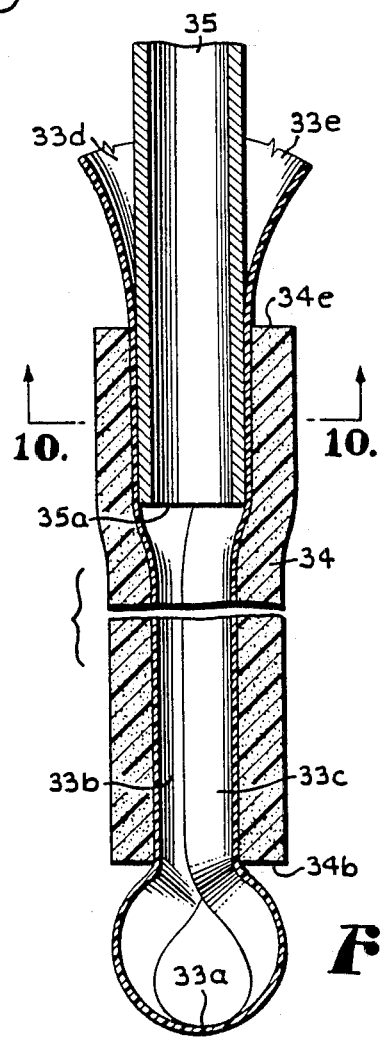
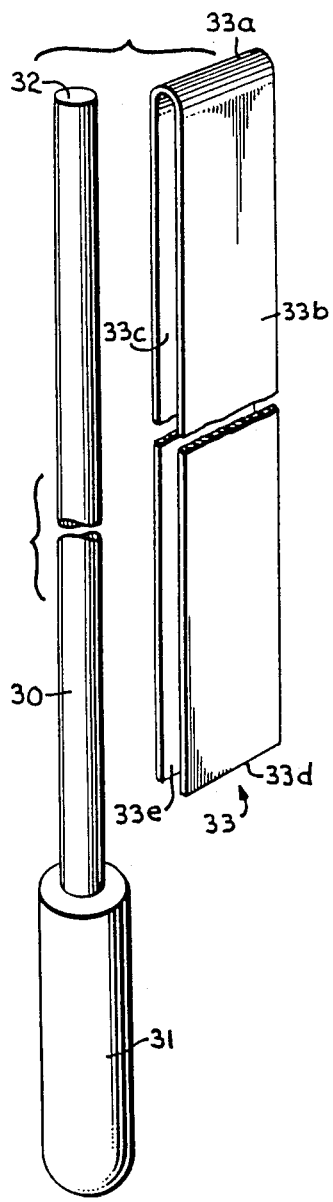
Fig.5.

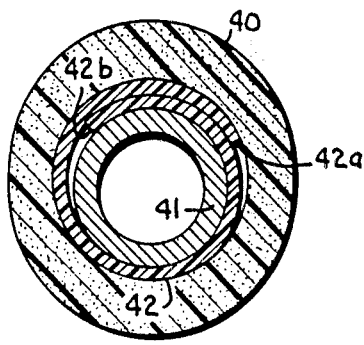
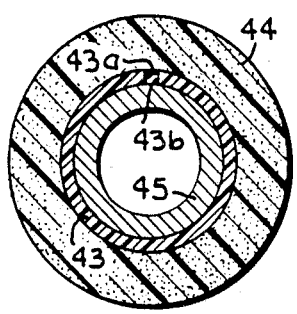
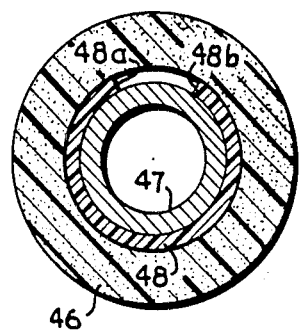
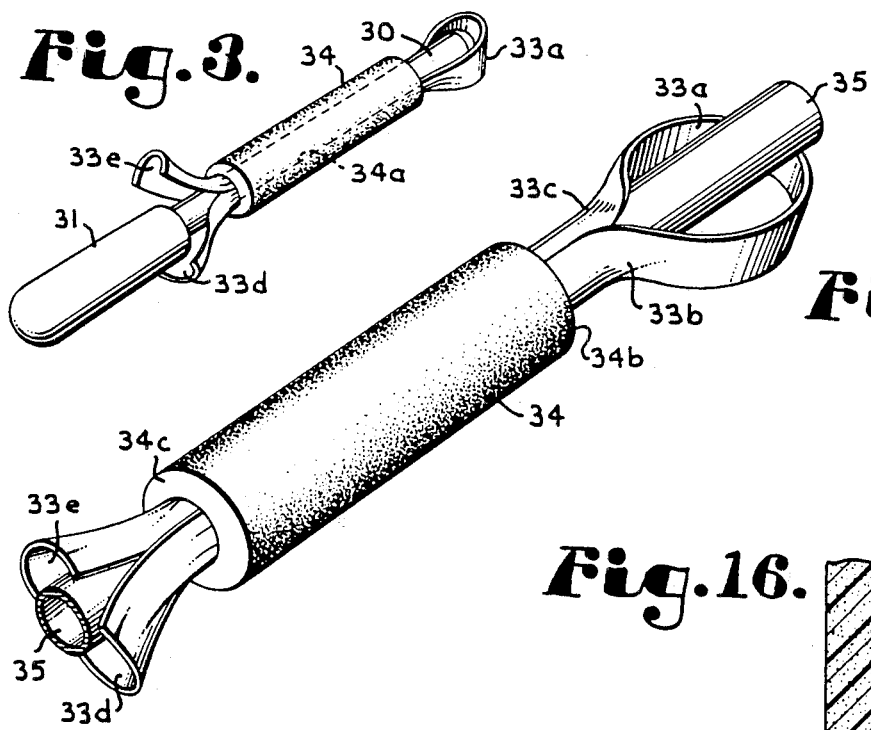
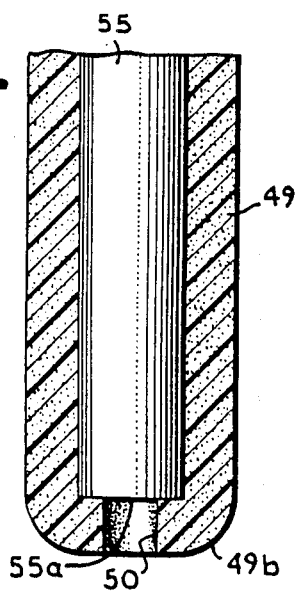
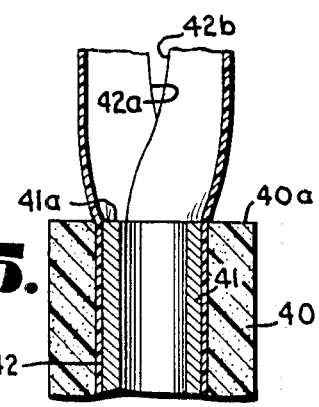

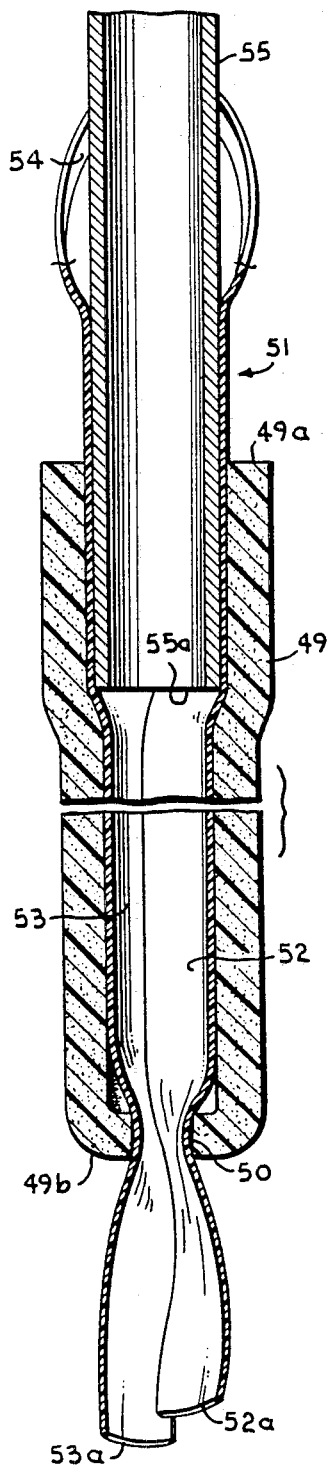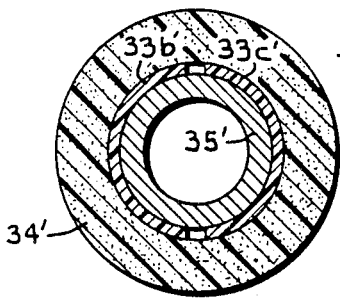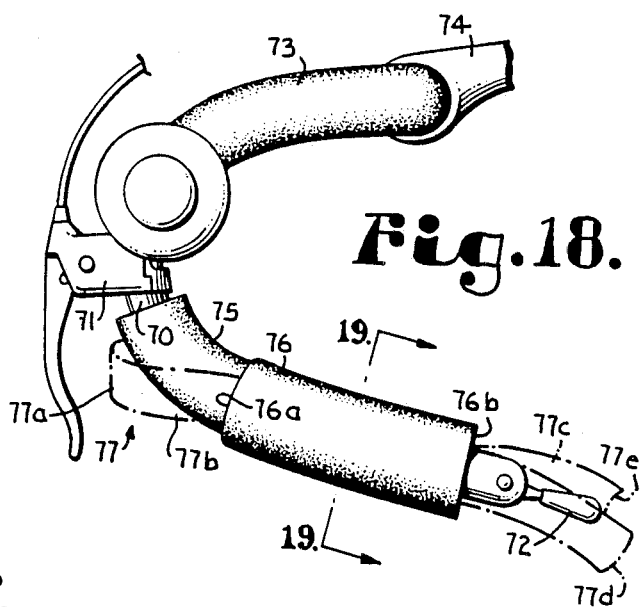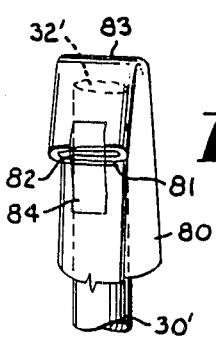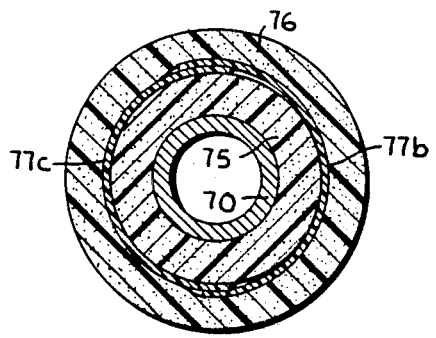

METHOD FOR HANDLEBAR GRIP INSTALLATION

BACKGROUND OF THE INVENTION

This invention relates in general to the mounting or positioning of elastomeric sleeves and grips on shafts or bars of greater outer diameter that the inner diameter of such sleeves or grips. In particular, the invention relates to the positioning of or mounting of elastomeric grips on bicycle and motorcycle type handlebars.

Such grips for bicycles and motorcycles are intended to provide a secure and insulated handhold on each side of the vehicle handlebar and further to serve as a vibration absorbing medium operative to reduce road shock for the rider, thereby increasing safety and riding enjoyment.

Manufacturers may ship bicycles and motorcycles to their retail distributors without the handlebar grips applied. This requires the proprietors of such stores to individually apply the grips. Manufacturers generally ship bicycles and motorcycles to their retail distributors with the handlebar grips or with handlebar tape applied. The proprietors of such retail stores will often apply other grips to satisfy the special requirements of their customers and of bike owners requesting grip replacement. Additionally, cycling enthusiasts are required to remove existing handlebar grips in order to install specialized racing or replacement grips to suit personal requirement or to replace handlebars, stems or handlebar-mounted components such as brake levers.

The usual and common method of installing handlebar grips is to liberally apply soapy water to the handlebar and the inner surface of the grip. The soapy water acts as a lubricant to facilitate the insertion of the handlebar end into the grip and positioning the grip either at the end of the handlebar or, alternatively, in the case of a bicycle handlebar, further along the bar to a location between the brake lever position and the stem. Even with such soap solution, installation is difficult and time-consuming, especially if bicycle handlebars are equipped with bar-end gear shifters which offer greater resistance due to their increased diameter. Further, the soap solution will allow the grip to slide about on the handlebar until the solution dries and, when dry, such will leave an undesirable residue. Corrosion of metal parts may also be a problem if the soap solution comes into contact with susceptible metal such as brake and derailleur cables.

In a typical example of such application, the following steps are employed. First, the handlebars must be thoroughly washed in order to insure the handlebar surface is as smooth as possible. As each grip is mounted, a considerable quantity of dishwashing liquid must be poured into the grip to coat the entire inner surface thereof. Then the entire handlebar must be rubbed down with such liquid so the entire bar is coated. A sudsy, very slick surface must be created on the entire handlebar surface. The grip is then applied by pushing, twisting and turning it as it is moved along the handlebar. At least 24 hours must be allowed for the grips to dry before they are firmly fixed on the handlebar.

BRIEF DESCRIPTION OF THE INVENTION

The subject system or method utilizes strips of plastic film or the equivalent which serve as a moveable interface between the inside surface of the grip and the outside surface of the handlebar. In practice, an elongate strip (which is looped over upon itself) of plastic film or like material of sufficient width to at least substantially cover the inside circumference of the grip and of sufficient length to extend beyond the ends of the grip (with the loop on one end and the free ends of the strip on the other) is inserted in the grip.

Preferably, the looped end of the elongate plastic strip is drawn over the end of the handlebar. Using the loop as a hand hold, the grip itself is then pulled onto the handlebar. In moving the grip fully onto and along the handlebar, pulling on the loop may be alternated with grasping a portion of the grip where it has already covered the handlebar and, with a back and forth twisting motion, forcing the grip along the handlebar. Alternatively, simultaneous pulling on the loop and twisting the grip may be employed. I have discovered that the intervening layer of plastic substantially reduces the friction between the handlebar and the grip.

When the grip is properly positioned on the handlebar, the elongate strips may be cut at the loop and pulled out one by one. Alternatively, they may be cut flush with the end of the grip at both ends and left in place to facilitate later adjustment or removal. If the plastic is "slick" enough the entire plastic assembly may be withdrawn as a unit.

As another option, the free paired ends may first be drawn over the end of the handlebar and used as a handhold in pulling the grip onto the handlebar. Likewise, pulling on the strip free ends then may be used to pull or aid in moving the grip along the handlebar to reach the desired position.

THE PRIOR ART

Applicant is aware of the following patents directed to the application of sleeves, tubing and the like to rigid shafts or members:

Hall U.S. Pat. No. 2,038,840 "Tool For Affixing Elastic Tubular Hand Grips . . . ", issued Apr. 28, 1936;

Bruener U.S. Pat. No. 2,830,361 "Means For Sleeving Flexible Tubing . . . ", issued Apr. 15, 1958;

Dienes U.S. Pat. No. 3,946,480 "Apparatus For Use In Applying An Expandable Resilient Sleeve . . . ", issued Mar. 30, 1976;

Von der Heyde, et al U.S. Pat. No. 4,130,928 "Method For Mounting A Tire Ladder", issued Dec. 26, 1978 and Keith U.S. Pat. No. 4,389,440 "Torque Preloaded Elastic Cover . . . ", issued June 21, 1983.

OBJECTS OF THE INVENTION

A first object of the subject invention is to provide improved means of and methods for more easily positioning elastomeric grips on bicycle or motorcycle type handlebars.

• Another object of the invention is to reduce and minimize the effort required in installing such grips on such handlebars by enabling simple, one man installation without the need for application of extreme force or use of special tools, fixtures or jigs.

Still another object of the invention is to remove the necessity of installing handlebar grips by the process of applying soapy water to the handlebar and the inner surface of the grip.

Yet a further object of the invention is to relieve the necessity of dealing with all the inconveniences of using soapy water as a lubricant for facilitating the installation of handlebar grips, including reducing the time required in application, removing the necessity of waiting for the solution to dry and avoiding the corrosion of metal parts.

Other and further objects of the invention will appear in the course of the following description thereof.

THE DRAWINGS

In the drawings, which form a part of the instant specification and are to be read in conjunction therewith, embodiments of the invention are shown and, in the various views, like numerals are employed to indicate and designate like parts.

FIG. 1 is a side view, partly a perspective from above, the view being fragmentary, of the front end of a bicycle showing two sets of grips mounted upon the handlebars in typical fashion.

FIG. 2 is an exploded view showing, on the right, an elongate strip of plastic material looped over upon itself and on the left a tool constituting an elongate rod with a handle, such tool operative to insert the elongate plastic strip into a handlebar grip element as seen in FIG. 3.

FIG. 3 shows the use of the device and elements of FIG. 2 in inserting an elongate, looped over plastic strip into a grip element for a handlebar or a sleeve to be received on a shaft.

FIG. 4 is a view of the grip element of FIG. 3 with the elongate overlapped strip mounted therewithin. Part of the grip element is cut away to show the overlapping of the strip portions within the grip.

FIG. 5 is a view like that of FIG. 4 but showing the initial insertion of the end of a handlebar, rod or shaft into the grip at the end thereof from which the strip free ends extend.

FIG. 7 is a view equivalent to FIG. 6, showing the grip or sleeve fully pulled on to a shaft or handlebar, this view being a three-quarter perspective view from above.

FIG. 12 is a view like that of FIG. 10, but showing the use of a single elongate strip which is wrapped upon itself.

FIG. 13 is a view like those of FIGS. 10 and 12, but showing the use of a single elongate strip which is of insufficient width to overlap upon itself within the grip and around the handlebar.

FIG. 14 is a view like those of FIGS. 10, 12 and 13 showing the use of a single elongate strip of considerably lesser width than the outside diameter of the handlebar or inner diameter of the grip.

FIG. 15 is a fragmentary end sectional view of a grip mounted at the end of a handlebar during the removal of a looped over strip from between the grip and handlebar in separate sections therefrom.

FIG. 16 is a fragmentary sectional view of the end of a grip on the end of a handlebar, being the end result of the process of FIG. 17.

FIG. 17 is a cross sectional view of a grip being mounted on the end of a handlebar where the closed end of the loop leads in the application of the grip to the handlebar.

FIG. 18 is a fragmentary view of the end of a bicycle handlebar where a second grip has been mounted over a first grip.

FIG. 19 is a view taken along the line 19—19 of FIG. 18 in the direction of the arrows.

FIG. 20 is a view like FIG. 10 but showing strip portions of insufficient width to overlap within the grip and on the handlebar.

FIG. 1

Figure 6:
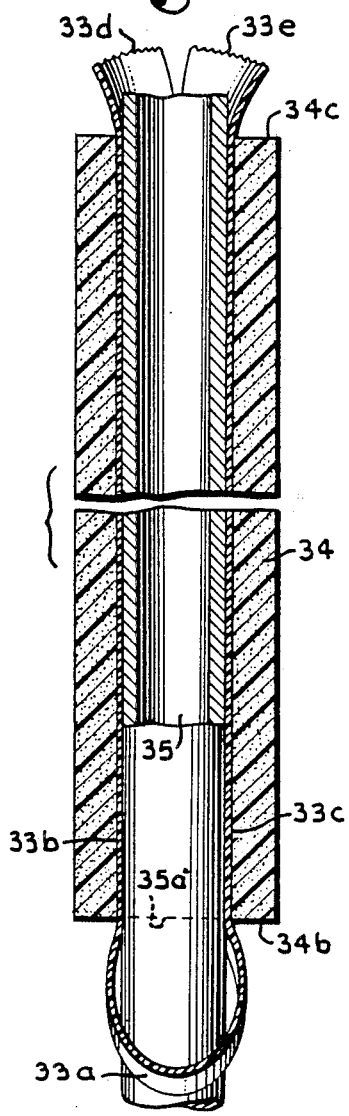
FIG. 6 shows the handlebar of FIG. 5 (or shaft therein) having the grip or sleeve fully pulled thereon or thereover. Parts of this view are cut away and in section to better illustrate the construction.
Figure 8:
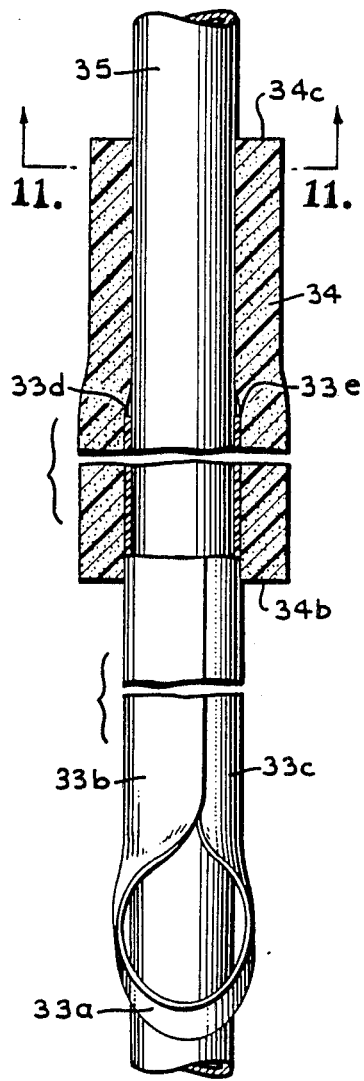
FIG. 8 is a view of the construction of FIGS. 4-7, inclusive wherein the looped elongate strip is being withdrawn as a unit from the grip by pulling on the loop.

FIG. 1 is a side, partly perspective view, from above, of the handlebar section of a bicycle. In this view there is seen head tube 100, top tube 101, down tube 102 and fork 103. Stem 104 mounts handlebar 105. Upper grips 106 and 106a are positioned on handlebar 105 next to the stem connection, while lower grips 107 and 107a are positioned on the outboard ends of the handlebar. Brake handle mountings 108 and 108a are mounted on handlebar 105 between upper grips 106, 106a and lower grips 107, 107a. Mountings 108 and 108a typically must be removed to replace the upper grips 106 and 106a. Front brake cable is seen at 109 and rear brake cable at 110. Gear shift lever 111 and 111a are associated with gear shift cables 112.

FIGS. 2-11, INCLUSIVE

Referring to FIG. 2, therein is shown an elongate, straight, round rod 30 mounted into handle 31. Rod 30, having free end 32, is preferably of greater length (see FIG. 3) than the length of the resilient sleeve or elastomeric grip which it is to penetrate in the process of inserting the looped or overlapped strip, film, band, etc. In FIG. 2, next to rod 30 there is seen elongate strip 33 of plastic film or sheet which has been, typically, cut from a roll of the material and is now looped, turned or curved over upon itself as at 33a. This gives two substantially equal leg lengths 33b and 33c with free ends 33d and 33e.

FIG. 3 shows the tool 30, 31 having forced the plastic strip 33 into and through an elongate elastic sleeve or elastomeric grip 34. This results in the intermediate product of FIG. 4 where the looped over plastic strip 33 extends from one end 34b of sleeve or grip 34 with the closed loop end 33a and from the other end 34c of the grip with free ends 33e and 33d of strip 33.

Figure 9:
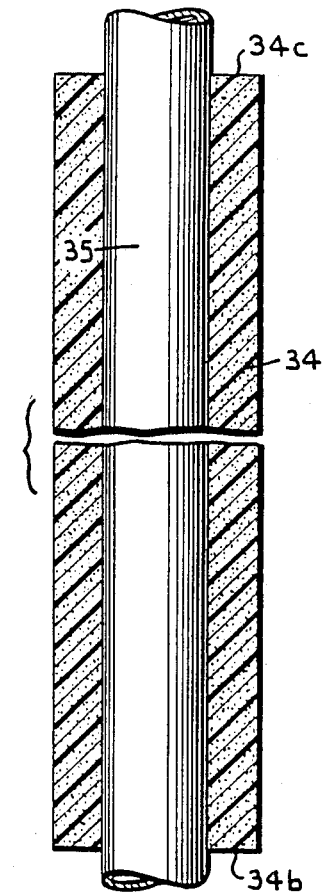
FIG. 9 is a sectional view analogous to that of FIG. 8 where the grip is on the handlebar (or sleeve is on the shaft) after removal of the elongate looped strip from therebetween.
Figure 10:
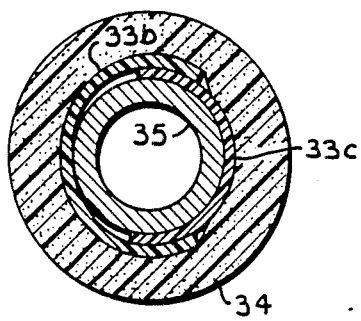
FIG. 10 is a view taken along the line 10—10 of FIG. 5 in the direction of the arrows.
Figure 11:
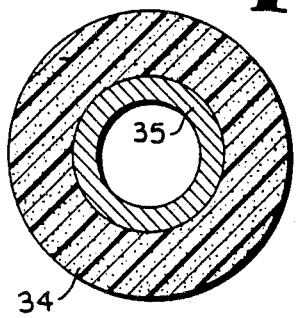
FIG. 11 is a view taken along the line 11—11 of FIG. 8 in the direction of the arrows.

In the example shown, of FIGS. 2-11, inclusive, the width, combined, of the two sides of strip 33 at 33b and 33c, is greater than the internal diameter or circumference of the internal passageway or opening 34a in sleeve or grip 34. This is best seen in FIG. 10 and is preferable.

Once the overlapped strip of plastic is inserted into the grip or sleeve 34, the said sleeve or grip may be stored indefinitely or applied immediately to a handlebar or any elongate bar, rod, shaft or the like. The application may be made from either end of the grip or sleeve 34. That is, the application may be made from the loop 33a end or the free strip end 33d, 33e. Often it is preferable (see FIG. 17) to insert from the end 34b having the loop 33a thereat so the loop itself may be grasped as a particular structure or handgrip to help pull the grip or sleeve onto the handlebar, shaft, etc. However, the first description will be of an application from the free strip 33d, 33e end.

Referring to FIG. 5, therein is shown the sleeve or grip 34 being moved or pulled onto a handlebar, hollow shaft or the like 35 having free end 35a. To aid in pulling and/or pushing sleeve 34 on shaft or handlebar 35, the operator grasps the free ends 33d and 33e of the strip 33 and pulls, alternating with twisting and rotating sleeve or grip 34 back and forth, to and fro, and arcuately around end 35a of shaft 35 and the further inboard portions thereof. Use of a vise may be helpful or second person aid in stabilizing the handlebar or shaft 35 if a vise is not practical.

In FIG. 6, the entire length of sleeve or grip 34 has been received on shaft or handlebar 35. Optionally end 34b of grip 34 may stop at the free end 35a. FIG. 6 shows grip 34 in the manner of upper grip 106 in FIG. 1.

This latter situation is seen in a three-quarter perspective view from above in FIG. 7. In these figures so far discussed, there has been no indication of a particular requirement that the elastic sleeve or grip 34 be at the end of or at any particular position along the handlebar, shaft, rod, etc. 35. For a bicycle, a grip would be positioned either as upper grip 106 or lower grip 107 in FIG. 1. Assuming that the grip or sleeve 34 is positioned as required on rod or shaft 35 in FIGS. 6 and 7, it is then desirable to either: (1) remove the plastic strip 33 from between the grip/sleeve 34 and the handlebar/shaft 35 or (2) trim the excess length of the plastic strip 33 from the ends of the grip or sleeve 34.

This is typically done by cutting the loop portion 33a by scissors, a knife, a razor or the like so that one leg 33b, 33c of the strip may be withdrawn at a time from between the grip or sleeve 34 and handlebar or shaft 35. Alternatively, as in FIG. 8, if the plastic material is "slick" enough with respect to the bar 35 and the grip 34, it may be pulled as a unit from the position of FIGS. 6 and 7 using the loop 33a as a hand grip.

FIG. 9 shows the grip or sleeve 34 on handlebar, shaft or rod, etc. 35 after removal of the plastic strip 33 from therebetween.

Alternatively, and particularly looking at FIGS. 6 and 7, using a knife, razor or scissors, the free ends 33e and 33d may be trimmed from their extension out the end 34c of grip/sleeve 34 and over or around handlebar or pipe 35. Likewise, the portions 33a, 33b and 33c visible to the right in FIG. 7 may also be trimmed down to end 34b. This leaves some of the plastic strip portions 33b and 33c actually inside grip/sleeve 34 to aid grip removal or further shifting or motion, if such be desired, of grip/sleeve 34 on rod, etc. 35. This option would be unusual.

With respect to precisely positioning grip/sleeve 34 on handlebar/shaft 35, FIG. 7 shows a typical length of plastic strip 33a, 33b, 33c at one end 34b of the grip 34 useful in grasping and pulling by the user/applicator in adjusting grip or sleeve 34 along the length of pipe, bar, etc. 35. On the left in FIG. 7, the extension of the end portions 33d and 33e of plastic strip 33 preferably would be somewhat greater for use in a like purpose in applying the grip 34 and adjusting its position along the length of the handlebar or shaft 35.

FIGS. 12, 13 AND 14

Referring to FIG. 12, therein is shown a variation in structure of the plastic insert which goes between the outer grip or sleeve 40 and the inner handlebar, shaft or rod 41. Specifically, this plastic insert 42 is one comprising an elongate plastic sheet having side edges 42a and 42b. The plastic sheet 42 is first wrapped or rolled upon itself to make a circular tube. Then one end is folded over (FIG. 21) and temporarily secured to the tube to enable the end 32 of rod 30 (when inserted in the tube) to internally bear thereagainst. This enables rod 30 to force the insert into a grip 40 in the same manner that (FIG. 3) rod 30 forces rolled over or looped over taped strip segments 33 into grip 34. In a like manner, the closed end of the tube is forced out of one end of a grip or sleeve as in FIG. 3, while the nonclosed end of the tube as seen to the left in FIG. 3 extends out of the other end of the grip. Once the closed end of the sheet is released from closure, removing any tape or the like which may have been used to hold it in closed position, then either end of the sleeve may be used to aid in pulling the grip or sleeve 40 onto handlebar or the like 41. This sheet must be slick enough for removal as a unit or the ends thereof trimmed to the ends of the grip.

In FIG. 13, again, an elongate sleeve 43 having side edges 43a and 43b is employed between a handgrip or elastic sleeve 44 overlying handlebar, rod or shaft 45. In this case, the elastic sleeve is of insufficient width to overlap as is seen in FIG. 12 at 42a and 42b.

In application of the sleeve 43 into grip 44, one end of the sleeve is folded over and taped or otherwise fixed to the rest of the sleeve to give an abutment end pocket or surface into which the end 32 of elongate rod 30 received in handle 31 may be received. Then, in the manner of FIG. 3, the sleeve is forced into and through the grip 44 in the manner strip 33 is so done in FIG. 3. Once the sleeve has its two longer ends (longer than the grip 44) extending substantially equal distances outwardly therefrom, then tool 31, 30, 32 is removed from the grip by grasping the sleeve end equivalent to 33a in FIG. 3 and pulling the inserting tool outside the grip.

The folded over end of the plastic sleeve is then freed from the sleeve itself. At that point, as is seen in FIG. 5, the handlebar shaft, pipe or rod may be inserted in either end of the grip as both ends of the sleeve will be substantially the same with respect to structure. Specifically, that is, openable from the free ends thereof to permit the insertion of the handlebar, rod or shaft end therein.

FIG. 14 merely extends the principle of FIG. 13. Grip 46 is received on shaft or handlebar 47 with sleeve 48 therewithin. Sleeve 48 is of lesser width than sleeve 43, whereby to have side edges 48a and 48b.

It is preferred to have overlap of the insert ends as in FIG. 12 (also see FIG. 10) or at least near abutment of the ends of the plastic sheet as in FIG. 13. However, the construction of FIG. 14 will work in aiding the application of grips to handlebars or sleeves to shafts.

FIGS. 17, 15 AND 16

Referring first to FIG. 17, therein is shown a handgrip 49 having an inner end 49a and an outer end 49b. This is a lower grip as at 107 in FIG. 1. The outer end 49b is restricted centrally and has relatively smaller opening 50 centrally thereof compared to the opening at the free end 49a of grip 49. This grip 49 is equivalent to a lower grip as seen in FIG. 1.

By means of a tool 31, 30, 32 equivalent to that seen in FIG. 2, an elongate plastic strip 51, generally designated, has been forced through grip 49 exactly as strip 33 was forced through grip 34 in FIG. 3. The overlapping legs or strips 52 and 53 (per FIG. 10) of strip 51 have free ends 52a and 53a extending out through opening 50 to some considerable length. At the other end of grip 49, there is elongate loop 54. Loop 54 and end 49a of grip 49, as well as portions of overlapping strips 53 and 52 have been penetrated by the lower end 55a of handlebar, shaft, rod or the like 55. With the loop 54 being displaced to one side of handlebar, shaft or rod 55 in the manner seen in FIG. 7, the applicator of the grip 49 to handlebar 55 will use the action combination of pulling on loop 54, shoving on the free end 49b of grip 49 and twisting back and forth of the already engaged portion of grip 49 to move the entire grip onto handlebar 55.

Once this is done, several options are possible. In the first place, assuming the amount of friction between the handlebar and the grip with respect to the plastic strip 51 is sufficiently small, then the entire strip may be pulled intact out of grip 49 by pulling on loop 54. Alternatively, the loop 54 may be cut so there merely remains separate extensions of strips 52 and 53. In this case, then the individual strips 52 and 53 may be pulled out of the grip 49 one at a time. This may be out opening 50 which would probably be more difficult (see FIG. 16) or preferably out the opposite end 49a of the grip. Yet further alternatively, once the handlebar 55 fills grip 49, with its lower end 55a abutting the inside edges of inwardly turned wall portion 49b, all of the elongate plastic strip 51 may be trimmed away from (1) end 49a of grip 49 and (2) opening 50. This would leave the internal overlapping sleeve portions 52 and 53 (see FIG. 10) around the handlebar and within the grip. Such, depending again on the quantity of friction between the plastic, the handlebar and the grip, may optionally be left to aid in later removal of the grip from the handlebar.

FIG. 15

FIG. 15 is a fragmentary detail, in section, of the upper end of the construction of FIG. 12. In FIG. 12, sleeve or grip 40 receives handlebar or pipe, etc. 41 therewithin. A sheet of plastic material 42 is first wrapped upon itself and one end thereof closed upon itself for insertion into the grip or sleeve 40. When the said sheet 42 is properly inserted in sleeve or grip 40, it protrudes from both ends of same, as is the case of the plastic strip of the earlier figures, particularly FIGS. 2 and 4. Thereafter, utilizing the aid of sheet 42 to reduce friction between handlebar 41 and grip 40, etc., the grip is fully mounted on the handlebar. This is done by pulling on one end of the sheet and twisting the grip.

FIG. 15 shows the lower end of the handlebar at 41a in line with the lower end of grip 40 at 40a.

At the stage seen in FIG. 15, the operator or user must decide whether to draw out plastic sheet 42 from between the grip and the handlebar, a sleeve and pipe, etc. or whether to trim off the ends of the plastic sheet flush with surfaces 40a and 41a, as well as in like manner at the other end at the extension of the sheet 42 past the other end (not seen) of grip or sleeve 40.

FIG. 16

FIG. 16 is a fragmentary view of the lower end of the grip 49 after the handlebar 55 has been fully received within the grip. Additionally, the entire elongate strip of plastic film 51 has been removed from between grip 49 and handlebar 55. The preferred way of doing this is, where there is the restricted opening 50 in the outer end 49b of grip 49, would be to cut loop 54 and then pull out the plastic strip lengths 52 and 53 one at a time. This can be done either from the loop end 54 or the strip end 52a and 53a, referring to FIG. 17.

FIGS. 18 AND 19

Referring first to FIG. 18, therein is shown a handlebar 70 carrying brake handle body 71 thereon and having a bar end gear shifter 72. Upper grip 73 is positioned on the handlebar extending from brake handle body 71 to stem connection 74. Lower grip 75 extends from closely adjacent brake frame 71 out to the end (not seen) of handlebar 70 from which bar end gear shifter 72 extends.

The purpose of this illustration is to show the application of a second grip 76 (of somewhat lesser length than lower grip 75) on lower grip 75.

The purpose of a double grip 75, 76 at the handgrip position near the end of the handlebar 70 (on each side of the bike) is to provide increased vibration and shock absorption in riding and, additionally, for those with larger hands, provide a more secure and useful grip.

In this view, there is shown, in dotted lines, the use of a plastic strip generally designated 77. This strip is analogous to strip 33 seen in FIG. 2. The looped end in this case is seen at 77a. As may be seen from FIG. 19, the overlapped strips 77b and 77c (see FIG. 10) preferably provide for complete plastic coverage or interface between the two grips. To the right in FIG. 18, one of the free end extensions 77d is seen extending past the lower end of second grip 76.

In use, once again, a tool in the manner of that seen to the left in FIG. 2 is employed to insert the looped over, rolled over or folded over strip in sleeve 76 so that substantially equal length legs thereof are provided. In the manner seen in FIG. 3, the tool at the left of FIG. 2 pushes the closed looped end 77a into, through and past the top end 76a of second grip 76. The length of the strip 77 must be such that, when doubled over, portions thereof as at 77b will extend from the end 76b of grip 76 and 77d from end 76b.

In application, the loop 77a is pulled downwardly (or upwardly) out of the way of the open strips and the plastic initial strip portions moved over the bar and gear shifter 72. End 76a, by virtue of the slick or low friction plastic surfaces 77b and 77c rides up over and onto the outer end of original grip 75. Once this is accomplished by whatever pulling, pushing, shoving and prying is required, then the second grip 76 may be worked onto primary grip 75 by pulling on the loop end 77a and grasping secondary grip 76 and rotating it back and forth on the slick plastic interface, while pushing it to the left in the view of FIG. 18.

Eventually, when grip 76 is positioned as desired on grip 75, the same options as before are present with respect to the plastic material. First, it may be trimmed at both ends, leaving the plastic between the grips for further manipulation of the grips or removal of the outer grip from the inner grip. If the slickness or slidability is extraordinarily great, then, probably, the plastic will be removed. Such removal is typically by cutting the loop 77a and then pulling out legs 77b and 77c one at a time. In this case, such pulling out very well might be from left to right in the view of FIG. 18. Alternatively, and again depending on the friction between materials, the entire plastic insert might be pulled from between the grip by grasping the loop 72 and pulling it to the left in FIG. 18.

FIG. 20

FIG. 20 is to be compared with FIG. 10. It should additionally be compared with FIGS. 3–9, inclusive. FIG. 20 is a view exactly like that of FIG. 10 except for the fact that the elongate plastic strips 33b' and 33c' are not of as great width as are the like strips or legs 33b and 33c of FIGS. 2–10, inclusive. The looped strip of plastic film in FIG. 20 is of the same nature as strip 33 of FIG. 2 except that it is of lesser width. When employed with handlebars, pipes, rods, bars or the like 35', of like outer diameter to the same structure 35 in FIGS. 2–10, inclusive, there is no overlap of the strips. This does not prevent effective aid in mounting the grip or sleeve 34' on the grip, pipe, etc. 35', although more friction may be encountered.

One material that has been found to work satisfactorily for one inch diameter of alumnium alloy bicycle handlebars and Spenco grips is 0.003-inch thick by 1¾ inch wide polyethylene terephthalate film. Another material which has the proper combination of tensile strength, elongation and coefficient of friction is biaxially oriented polypropylene film, for comparable use. Other materials may also be satisfactory.

FIG. 21

FIGS. 12, 13 and 14 show the use of a single elongate strip is wrapped upon itself in contrast to the folded over strip of FIG. 2. FIG. 21, which is a fragmentary top view of a rod 32' like rod 32 of FIG. 2, also includes one end of an elongate strip 80 like that of FIG. 12 (or the equivalent) rolled upon itself and wrapped or folded over the end 32' of rod 30 with such folded over end 83 captured by (briefly) adhesive tape, plastic tape or the like. This is to enable insertion of the leading end of the single strip (wrapped upon itself) into a grip or sleeve in the manner seen for the folded over strip in FIGS. 3 and 7.

Once the end 80, 83 seen in FIG. 21 of the wrapped strip is pushed through and free of the far end of the grip element, the tape strip 84 may be removed. From thence the device operates as described with respect to that type of nonfolded over (wrapped on itself) strip as the grips or sleeve is pulled or pushed onto a shaft or handlebar.

In the view of FIG. 21, 30' is the upper portion of the shaft of the tool seen in FIG. 2 with 32' the free end. 80 constitutes the strip or sheet itself which is wrapped upon itself so that edges and ends 81 and 82 overlap one another. 83 designates the folded over, wrapped upon itself end of the strip. The removable tape strip is seen at 84, insuring the integrity and strength of the closed end until it is pushed through the grip or sleeve.

From the foregoing, it will be seen that this invention is one well adapted to attain all of the ends and objects hereinabove set forth together with other advantages which are obvious and which are inherent to the apparatus and process.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A process of applying a grip to a handlebar comprising the steps of:
   (1) inserting within the grip a loop of low friction material with two elongate strips of said material attached thereto, one at each side of the loop,
   (2) said strips in combination being of sufficient width to at least substantially cover the inside circumference of the grip and of sufficient length to cause the loop itself and the strip free ends to extend beyond opposite ends of the grip,
   (3) drawing one end of the loop and strips over the handlebar,
   (4) while using said one end of the loop and strips as a hand hold, pulling the grip onto the handlebar,
   (5) forcing the grip further onto and along the handlebar by pulling on one end of the loop and strips and twisting and pushing on the grip, per se and
   (6) when the grip is properly positioned on the handlebar, cutting the loop and removing the strips, one by one, from under the grip and next to the handlebar.

2. A process as in claim 1 wherein the loop of low friction material is drawn over the handlebar and the grip is pulled onto the handlebar using the loop itself as a handhold, the grip being forced along the handlebar partially by pulling on the loop.

3. A process as in claim 1 wherein the ends of the strips are first drawn over the handlebar, the ends of the strips are used as a handhold in pulling the grip onto the handlebar and the grip is forced along the handlebar partially by pulling on the free ends of the strips.

4. A process as in claim 1 wherein the strips, in combination are of sufficient width to cover the inside circumference of the grip.

5. A process as in claim 1 wherein there is already applied to said handlebar a first grip and the other grip receiving the loop of low friction material is mounted on said handlebar over said first grip.

6. A process of applying a grip to a handlebar, comprising the steps of:
   (1) inserting within the grip a loop of low friction material with two elongate strips of said material attached to the ends of said loop,
   (2) said strips being of sufficient width to at least substantially cover the inside circumference of the grip and of sufficient length to cause the loop itself and the two elongate strip free ends to extend beyond opposite ends of the grip,
   (3) drawing one end of the loop and strips over the handlebar,
   (4) while using said one end of the loop and strips as a handhold, pulling the grip onto the handlebar,
   (5) forcing the grip further onto and along the handlebar by pulling on one end of the loop and strips and twisting and pulling on the grip, per se and
   (6) when the grip is properly positioned on the handlebar, cutting the loop and trimming both ends of each said strip substantially flush with the end of the grip, whereby to leave said strips in place.

7. A process as in claim 6 wherein the loop of low friction material is drawn over the handlebar and the grip is pulled on to the handlebar using the loop itself as a handhold, the grip being forced along the handlebar partially by pulling on the loop.

8. A process as in claim 6 wherein the ends of the strips are first drawn over the handlebar, the ends of the strips are used as a handhold in pulling the grip onto the handlebar and the grip is forced along the handlebar partially by pulling on the free ends of the strips.

9. A process as in claim 6 wherein the strips, in combination, are of sufficient width to cover the inside circumference of the grip.

10. A process as in claim 6 wherein there is already applied to said handlebar a first grip and the other grip receiving the loop of low friction material is mounted on the handlebar over said first grip.

11. A process of applying a resilient sleeve to a shaft comprising the steps of:
   (1) inserting within the sleeve a sheet of low friction plastic material,
   (2) said sheet being of sufficient width to at least substantially cover the inside circumference of the sleeve and of sufficient length to cause opposite free ends of said sheet to extend beyond opposite ends of the sleeve,
   (3) drawing one end of the sleeve and the sheet extension at that end thereof over one end of the shaft,
   (4) while using said one end of the sheet extension as a hand hold, pulling a portion of the sleeve onto a portion of the shaft,
   (5) forcing the sleeve further onto and along the shaft by pulling on said one end of the sheet extension and twisting and pushing on the sleeve, per se and
   (6) when the sleeve is properly positioned on the shaft, removing the sheet from under the sleeve and next to the shaft.

12. A process as in claim 11 wherein one end of said sheet is closed upon itself prior to inserting said sheet within said sleeve.

13. A process as in claim 11 wherein said sheet is of greater width than the outer diameter of the shaft and inner diameter of the sleeve.

14. A process as in claim 11 wherein the sheet is of lesser width than the outer diameter of the shaft and the inner diameter of the sleeve.

15. A process as in claim 11 wherein said shaft already has a first resilient sleeve mounted thereon, the other sleeve receiving the sheet of low friction plastic material being mounted on said shaft over said first sleeve.

16. A process of applying a resilient sleeve to a shaft comprising the steps of:
   (1) inserting within the sleeve an elongate strip of low friction plastic material looped upon itself substantially intermediate the length thereof whereby to provide two elongate, opposed strips of said material, one of said strips extending from each side of the loop,
   (2) said elongate strips, in combination, being of sufficient total width to at least substantially cover the inside circumference of the sleeve and outside surface of the shaft and of sufficient length, each of them, to cause the loop itself, with portions of the strips next to the loop and the strip free ends each to extend beyond opposite ends of the grip,
   (3) inserting one end of said sleeve over one end of said shaft through one of the end of the loop and the free strip ends,
   (4) forcing one end of the sleeve onto the handlebar while pulling on the portion of the elongate strip positioned at that end of the sleeve,
   (5) forcing the sleeve further onto and along the shaft by pulling on the portion of the elongate plastic strip at the engaged end of the sleeve and twisting and pushing on the grip, per se and
   (6) when the sleeve is fully and properly positioned on the shaft, removing the plastic material from between the sleeve and shaft.

17. A process as in claim 16 wherein the loop of low friction plastic material is drawn over the shaft and the sleeve is pulled onto the shaft using the loop itself as a hand hold, the sleeve being forced along the shaft partially by pulling on the loop.

18. A process as in claim 16 wherein the ends of said elongate strips are first drawn over the shaft, the ends of the elongate plastic strip being used as a hand hold in pulling the sleeve onto the shaft and the sleeve is forced along the shaft partially by pulling on the free ends of the strips.

19. A process as in claim 16 wherein the elongate plastic strips, in combination, are of sufficient width to cover the inside circumference of the sleeve.

20. A process as in claim 16 wherein there is a first resilient sleeve already mounted on said shaft and the other sleeve receiving said elongate strip of low friction plastic material is mounted on said shaft over said first resilient sleeve.

21. A process of applying a resilient sleeve to a shaft comprising the steps of:
   (1) inserting within the sleeve a sheet of low friction plastic material,
   (2) said sheet being of sufficient width to at least substantially cover the inside circumference of the sleeve and of sufficient length to cause opposite free ends of said sheet to extend beyond opposite ends of the sleeve,
   drawing one end of the sleeve and the sheet extension at that end thereof over one end of the shaft,
   (4) while using one end of the sheet extension as a hand hold, pulling a portion of the sleeve onto a portion of the shaft,
   (5) forcing the sleeve further onto and along the shaft by pulling on said one end of the sheet extension and twisting and pushing on the sleeve, per se and
   (6) when the sleeve is properly positioned on the shaft, removing the sheet extension from the sheet exterior of the sleeve.

22. A process as in claim 21 wherein one end of said sheet is closed upon itself prior to inserting said sheet within said sleeve.

23. A process as in claim 21 wherein said sheet is of greater width than the outer diameter of the shaft and the inner diameter of the sleeve.

24. A process as in claim 21 wherein the sheet is of lesser width than the outer diameter of the shaft in the inner diameter of the sleeve.

25. A process as in claim 21 wherein there is a first resilient sleeve already mounted on said shaft and the other sleeve receiving the sheet of low friction plastic material is mounted on said shaft over said first resilient sleeve.

* * * * *